United States Patent [19]
Suzuki et al.

[11] 3,847,747
[45] Nov. 12, 1974

[54] PROCESS FOR PRODUCING CHLORAMPHENICOL ANALOGS

[75] Inventors: Takeo Suzuki; Fusao Tomita; Hirofumi Nakano; Haruo Honda, all of Tokyo, Japan

[73] Assignee: Kyowa Hakko Kogyo Co., Ltd., Tokyo, Japan

[22] Filed: Apr. 3, 1973

[21] Appl. No.: 347,399

[30] Foreign Application Priority Data
Apr. 5, 1972   Japan.............................. 47-33483

[52] U.S. Cl. ............................... 195/96, 195/80 R
[51] Int. Cl. ........................................... C12d 13/00
[58] Field of Search............. 195/96, 80 R, 112, 42, 195/79

[56]     References Cited
UNITED STATES PATENTS
2,483,892   10/1949   Ehrlich et al. .................... 195/80 R
3,751,339   7/1973    Suzuki et al. ......................... 195/96

*Primary Examiner*—Lionel M. Shapiro
*Assistant Examiner*—Robert J. Warden
*Attorney, Agent, or Firm*—Craig & Antonelli

[57]             ABSTRACT

A process for producing chloramphenicol analogs, which comprises culturing a bacterium capable of producing chloramphenicol analogs, belonging to the genus *Corynebacterium* or *Nocardia* and having a resistance to chloramphenicol or its analogs in a nutrient medium, and recovering chloramphenicol analogs from the culture liquor.

17 Claims, No Drawings

PROCESS FOR PRODUCING CHLORAMPHENICOL ANALOGS

This invention relates to a process for producing chloramphenicol analogs by fermentation. More particularly, it relates to a process for producing chloramphenicol analogs, which comprises culturing a bacterium capable of producing chloramphenicol analogs, belonging to the genus *Corynebacterium* or *Nocardia* and having a resistance to chloramphenicol or its analogs in a nutrient medium and recovering chloramphenicol analogs from the culture liquor. According to the process of the present invention, chloramphenicol analogs can be produced on a mass-production scale at a low cost.

The desired chloramphenicol analogs in the present invention are D-threo-2-amino-1-p-nitrophenyl-1, 3-propanediol, compounds having the structure thereof wherein the 2-amino group is substituted or replaced by acetamide, propionamide, isobutyramide or the like, and mono- and diacetyl derivatives thereof, exemplified by:

D-threo-2-isobutyramide-1-p-nitrophenyl-1, 3-propanediol (hereinafter referred to as compound I)

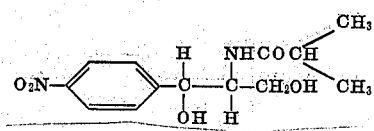

D-threo-2-propionamide-1-p-nitrophenyl-1, 3-propanediol (hereinafter referred to as compound II)

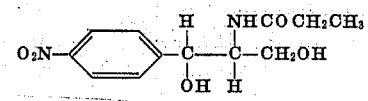

D-threo-2-acetamide-1-p-nitrophenyl-1, 3-propanediol (hereinafter referred to as compound III)

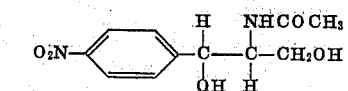

D-threo-2-acetamide-1-p-nitrophenyl-1, 3-propanediol-1, 3-diacetylester (hereinafter referred to as compound IV)

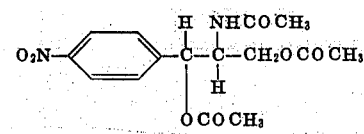

D-threo-2-propionamide-1-p-nitrophenyl-1, 3-propanediol-3-acetylester (hereinafter referred to as compound V)

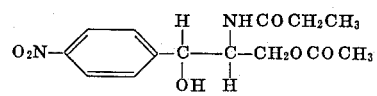

D-threo-2-acetamide-1-p-nitrophenyl-1, 3-propanediol-3-acetylester (hereinafter referred to as compound VI)

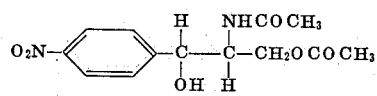

D-threo-2-amino-1-p-nitrophenyl-1, 3-propanediol (hereinafter referred to as compound VII)

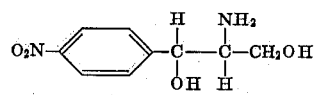

Of these chloramphenicol analogs, the compounds I, II and III are utilized as antibiotics and the compounds IV to VI are utilized as raw materials for the preparation of the compounds II and III. Further, the compounds I to VII are used as raw materials for the preparation of chloramphenicol. The compounds IV, V and VI are hydrolyzed under mild conditions to result the compound II or III. The compounds I – VI may be hydrolyzed to the compound VII, which is reacted with dichloracetic acid to produce chloramphenicol.

As regards the production of chloramphenicol analogs of the compounds I, II and III, there have been known processes which comprises the utilization of bacteria of the genus *Arthrobacter*, *Corynebacterium* or *Nocardia* (U.S. Ser. No. 137,695 filed Apr. 26, 1971 now U.S. Pat. No. 3,751,339 and No. 137,696 filed Apr. 26, 1971 now abandoned).

The present inventors, through further studies, have found that a bacterium belonging to the genus *Corynebacterium* of *Nocardia* and having a resistance to chloramphenicol or its analogs can produce a considerable amount of chloramphenicol analogs of the compounds I – VII, and have established the present invention.

The present inventors have made studies in an attempt to further improve the known bacteria which are capable of producing chloramphenicol analogs (for example, the bacteria of the genera *Corynebacterium* and *Nocardia* capable of producing chloramphenicol analogs, which are disclosed in U.S. Ser. No. 137,695 filed Apr. 26, 1971, and No. 137,696 filed Apr. 26, 1971).

As the result, it has been found that these bacteria have a considerably high resistance to chloramphenicol as compared with enteric bacteria but are incapable of growing in the presence of about 15 – 40 μg/ml of chloramphenicol. It has also been found that antibiotic chloramphenicol analogs inhibit the growth of bacteria having the ability to produce chloramphenicol analogs.

On the basis of these findings, the present inventors have obtained mutant strains of bacteria belonging to the genus *Corynebacterium* or *Nocardia*, which are capable of growing in the presence of a high concentration of chloramphenicol or its analogs. Such mutant strains are resistant to generally more than about 40 μg/ml of chloramphenicol though the maximum concentration of resistance varies depending upon the kinds of mutant strains. The present inventors have examined the productivity of chloramphenicol analogs by these mutant strains and found that they have a remarkably improved productivity of chloramphenicol analogs as compared with the known strains.

In obtaining mutant strains having a resistance to chloramphenicol or its analogs used in the present invention, any of the conventional methods for inducing mutation to obtain a strain having a resistance may be employed.

For example, a strain of the genus *Corynebacterium* or *Nocardia*, having the ability to produce chloramphenicol analogs (but having a very low resistance to chloramphenicol or its analogs, for example, *Corynebacterium hydrocarboclastus* ATCC 21628) is selected and its cells are treated according to the conventional artificial mutation means such as X-ray irradiation, ultraviolet ray irradiation, nitrous acid treatment, nitrogen-mustard treatment, nitrosoquanidine treatment, etc. After the treatment, the cells are cultured on an agar medium containing an appropriate amount of chloramphenicol or its analog (i.e., one of the D-threo-2-amino-1-phenyl-1, 3-propanediol derivatives, for example, the above described compounds I to VII, D-threo-2-dichloroacetamide-1-p-methylthiophenyl-1, 3-propanediol, etc.). Thus, a strain having a resistance to chloramphenicol or its analogs can be isolated. In this case, the resistibility to chloramphenicol possessed by the resultant mutant strain varies depending upon the concentration of chloramphenicol or its analog in the medium. In the present invention, usually a mutant strain having a resistance to 40 μg/ml or more of chloramphenicol is effective.

More particularly, for example, a strain of bacterium capable of producing chloramphenicol analogs (*Corynebacterium hydrocarboclastus* ATCC 21628) is preliminarily grown sufficiently in a nutrient medium comprising 1 percent meat extract, 1 percent polypeptone, 0.5 percent yeast extract, 0.3 percent sodium chloride and 2 percent sucrose (pH 7.3). This strain is sufficiently washed with an isotonic sodium chloride solution and resuspended in the isotonic sodium chloride solution in a concentration of about $5 \times 10^8$ cells per 1 ml. 5 ml of the suspension is placed in a Petri dish having a diameter of 9 cm and subjected to ultraviolet ray irradiation from a distance of 30 cm above by a commercially available ultraviolet ray lamp of 20-W for 2 minutes, while occassionally shaking. The lethal ratio of the cells after the ultraviolet ray irradiation is 99.99 percent. The cells are collected by centrifuge and cultured in the above described nutrient media, respectively, further containing 200 μg/ml and 500 μg/ml of chloramphenicol for 5 days. A portion of each of the cells thus grown is again cultured to grow in the media having the same composition as above and similarly containing 200 μg/ml and 500 μg/ml of chloramphenicol respectively. The resultant culture liquors are diluted stepwise to appropriate concentrations and smeared onto solid media prepared by adding 2 percent agar to the abovedescribed chloramphenicol-containing media.

The colonies grown on the solid media are transferred to solid media having the same composition and the growth is examined. Thus, strains capable of sufficiently growing in the presence of 200 μg/ml or 500 μg/ml of chloramphenicol are obtained. Typical strains are named CHCM-11 and CHCM-156.

Table 1 shows the examples of the strains having a resistance to chloramphenicol obtained in this manner. As is apparent from the table, since the mutants can grow at a higher concentration of chloramphenicol than the parent strains, the mutant strains have much enhanced resistance to chloramphenicol as compared with the parent strains. Although only the strains having a resistance to chloramphenicol are shown in the table, the strains having a resistance to the above described analogs of chloramphenicol also have a resistance to chloramphenicol. Therefore these strains are regarded to have a cross resistance and the mechanisms of the resistances are deemed to be similar. Examples of culturing steps will be explained below. Any of the thus obtained mutant strains has a higher ability to produce chloramphenicol analogs than the parent strains.

Table 1

Resistance to chloramphenicol

| | Minimum inhibitory concentration of chloramphenicol (μg/ml) |
|---|---|
| *Corynebacterium hydrocarboclastus* ATCC 21628 (parent strain) | 40 |

| | Concentration of chloramphenicol in the medium employed for isolation (μg/ml) |
|---|---|
| CHCM-11 (resistant strain) | 200 |
| CHCM-156 (resistant strain) | 500 |

| | Minimum inhibitory concentration of chloramphenicol (μg/ml) |
|---|---|
| *Norcardia paraffinica* ATCC 21198 (parent strain) | 15 |

| | Concentration of chloramphenicol in the medium employed for isolation (μg/ml) |
|---|---|
| NCCM-3 (resistant strain) | 50 |
| NCCM-305 (resistant strain) | 100 |

In carrying out the process of the present invention, n-paraffins or various hydrocarbon fractions containing n-paraffins are, for example, preferable as a carbon source. $C_{10}$ to $C_{22}$ and particularly $C_{12}$ to $C_{18}$ n-paraffins have been found to be effective. However, any hydrocarbon may be employed so far as it can be utilized by the microorganisms. Carbohydrates such as fructose, glucose, sucrose, etc., sugar alcohol such as sorbitol, etc. alcohol, organic acids such as acetic acid, etc. may also be employed. As a nitrogen source, inorganic and organic nitrogen sources which are usually utilized may be employed. In fermentation, inorganic salts and growth factors necessary for propagation which are used in the conventional fermentation are employed in addition to these main components.

More particularly, in carrying out the culturing, hydrocarbons or carbohydrates may be used as main carbon sources. They are supplemented, for example, with organic nitrogen sources such as corn steep liquor, yeast extract etc., inorganic metallic salts such as iron, manganese, magnesium, potassium, sodium etc., and growth-promoting factors to provide a culture medium. The medium is sterilized and inoculated with the microorganism. The culturing is carried out under aerobic conditions at 20–45°C. During the culturing, the pH is adjusted to 4–10, preferably 6-8, for example, by addition of urea solution, aqueous ammonia, ammonia or ammonium carbonate solution. The culturing is generally completed after 2 to 7 days.

Now, the examples of the present invention will be explained below but these examples merely illustrate the present invention and do not restrict the scope thereof.

EXAMPLE 1

Nocardia paraffinica NCCM-305 (FERM-P No. 1409) (ATCC 21785) is cultured with shaking for 24 hours in a medium comprising 1.0 percent meat extract, 1.0 percent peptone, 0.5 percent sodium chloride and 2 percent sorbitol and having a pH of 7.2 (before sterilization). The resulting seed culture is inoculated at an inoculum ratio of 10 percent (V/V) in 3.0 l of a medium having the following composition which is placed in a 5 l jar fermenter and sterilized;

| | |
|---|---|
| $KH_2PO_4$ | 0.2% |
| $NA_2HPO_4$ | 0.2% |
| $MgSO_4 \cdot 7H_2O$ | 0.1% |
| $MnSO_4 \cdot 4H_2O$ | 0.002% |
| $FeSO_4 \cdot 7H_2O$ | 0.02% |
| $ZnSO_4 \cdot 7H_2O$ | 0.001% |
| $(NH_4)_2SO_4$ | 0.5% |
| $CuCl_2 \cdot 2H_2O$ | 0.0003% |
| Corn steep liquor | 0.5% |
| Yeast extract | 0.5% |
| n-Paraffins (a mixture of $C_{12} - C_{15}$) | 10% (V/V) |

Culturing is carried out at 30°C for 65 hours with stirring at 650 r.p.m. and by aerating 1 l/l/min. of sterilized air. The pH of the medium is automatically adjusted to 6.5 to 6.8 with aqueous ammonia. Further, 100 ml of n-paraffins is supplemented three times to the medium every 12 hours. n-paraffins are almost consumed at the completion of culturing.

Microbial cells are removed from the resulting culture liquor by filtration. The filtrate is spotted on a silica gel thin layer plate, and developed with a solvent system of chloroform and methanol (93:7). Absorption spots are detected with ultraviolet rays. Each of the spots is scraped out, extracted with a certain amount of methanol and subjected to quantitative analysis by measuring an absorption at 278 m$\mu$. The compounds obtained are as follows:

| | |
|---|---|
| Compound I | 2.0 g/l |
| Compound II | 2.0 g/l |
| Compound III | 1.0 g/l |

At the same time, the above-described procedure is carried out using the parent strain (ATCC 21198). The results of this run are as follows:

| | |
|---|---|
| Compound I | 0.5 g/l |
| Compound II | 0.6 g/l |
| Compound III | 0.2 g/l |

EXAMPLE 2

Nocardia paraffinica NCCM-305 (FERM-P No. 1409) (ATCC 21,785) is used. Culturing is carried out for 70 hours in the same manner as described in Example 1 except that 10 percent fructose is used in place of n-paraffins. Fractionation and quantitative analysis are carried out in the same manner as described in Example 1. As the result, the production of the following compounds is revealed.

| | |
|---|---|
| Compound I | 1.0 g/l |
| Compound II | 0.8 g/l |
| Compound III | 0.8 g/l |
| Compound IV | 0.1 g/l |
| Compound V | 0.1 g/l |
| Compound VI | 0.1 g/l |

At the same time, the similar procedure is carried out using the parent strain (ATCC 21198). The following compounds are obtained:

| | |
|---|---|
| Compound I | 0.2 g/l |
| Compound II | 0.15 g/l |
| Compound III | 0.2 g/l |
| Compound IV – VI | not detected |

EXAMPLE 3

Corynebacterium hydrocarboclastus CHCM-156 (FERM-P No. 1408) ATCC 21,784) is used and culturing is carried out for 80 hours in the same manner as described in Example 1. Fractionation and quantitative analysis are carried out in the same manner as described in Example 1. As the result, the production of the following compounds is revealed:

| | |
|---|---|
| Compound I | 3.0 g/l |
| Compound II | 5.5 g/l |
| Compound III | 4.0 g/l |
| Compound IV | 3.0 g/l |
| Compound V | 1.0 g/l |
| Compound VI | 1.0 g/l |
| Compound VII | 0.5 g/l |

At the same time, the similar procedure is carried out using the parent strain (ATCC 21628). The results of this experiment are as follows:

| | |
|---|---|
| Compound I | 2.3 g/l |
| Compound II | 4.0 g/l |
| Compound III | 1.8 g/l |
| Compound IV | 0.3 g/l |
| Compound V | 0.3 g/l |
| Compound VI | 0.3 g/l |
| Compound VII | not detected |

EXAMPLE 4

Corynebacterium hydrocarboclastus CHCM-156 (FERM-P No. 1408) (ATCC 21784) is used and culturing is carried out for 75 hours in the same manner as described in Example 1 except that 10 percent sucrose is used in place of n-paraffins.

Fractionation and quantitative analysis are carried out in the same manner as described in Example 1. As the result, the production of the following compounds is revealed.

| | |
|---|---|
| Compound I | 2.7 g/l |
| Compound II | 5.3 g/l |
| Compound III | 4.2 g/l |
| Compound IV | 3.1 g/l |
| Compound V | 1.0 g/l |
| Compound VI | 1.0 g/l |
| Compound VII | 0.2 g/l |

The distribution of the products is nearly the same as that of the products in Example 3.

EXAMPLE 5

*Nocardia paraffinica* NCCM-3 (ATCC 21,924) is used. Culturing is carried out for 80 hours in the same manner as described in Example 1. Fractionation and quantitative analysis are carried out in the same manner as described in Example 1. As the result, the production of the following compounds is revealed.

| | |
|---|---|
| Compound I | 1.0 g/l |
| Compound II | 1.0 g/l |
| Compound III | 0.5 g/l |

EXAMPLE 6

*Corynebacterium hydrocarboclastus* CHCM-11 (ATCC 21,923) is used. Culturing is carried out for 85 hours in the same manner as described in Example 1. Fractionation and quantitative analysis are carried out in the same manner as described in Example 1. As the result, the production of the following compounds is revealed.

| | |
|---|---|
| Compound I | 2.5 g/l |
| Compound II | 4.5 g/l |
| Compound III | 2.5 g/l |
| Compound IV | 0.8 g/l |
| Compound V | 0.6 g/l |
| Compound VI | 0.5 g/l |
| Compound VII | 0.2 g/l |

EXAMPLE 7

*Corynebacterium hydrocarboclastus* CHCM-156 (FERM-P No. 1,408) (ATCC 21,784) and *Nocardia paraffinica* NCCM-305 (FERM-P No. 1409) (ATCC 21,785) are used. Culturing is carried out for 92 hours in the same manner as described in Example 1 except that 0.5 percent (W/V) of sodium acetate is used in place of 10 percent (V/V) of n-paraffins. During culturing, a solution of 7 percent of ammonium acetate in 50 percent acetic acid solution is added little by little continuously to the medium as the microorganisms propagate. Total of 1.5 l of the solution is added to the medium up to the completion of culturing. After the completion of culturing, the following compounds are produced in the culture liquor.

| | ATCC 21784 | ATCC 21785 |
|---|---|---|
| Compound I | 2.4 g/l | 1.0 g/l |
| Compound II | 3.0 g/l | 0.9 g/l |
| Compound III | 2.8 g/l | 1.0 g/l |
| Compound IV | 0.8 g/l | 0.4 g/l |
| Compound V | 0.7 g/l | 0.4 g/l |
| Compound VI | 0.4 g/l | 0.4 g/l |
| Compound VII | 0.2 g/l | trace |

What we claim is:

1. A process for producing chloramphenicol analogs, which comprises culturing a bacterium capable of producing chloramphenicol analogs belonging to the genus *Corynebacterium* or *Nocardia* and having a resistance to chloramphenicol or its analogs in a nutrient medium and recovering the chloramphenicol analogs from the resulting culture liquor.

2. The process of claim 1, wherein the analogs are D-threo-2-amino-1-p-nitrophenyl-1, 3-propanediol, derivatives thereof wherein the 2-amino group is substituted by an acylamino group selected from the group consisting of acetamide, propionamide, and isobutyramide or mono- and di-acetyl derivatives thereof.

3. The process of claim 1, wherein the nutrient medium contains an assimilable carbon source and culturing is effected under aerobic conditions.

4. The process of claim 3, wherein said carbon source is a $C_{10}$ to $C_{22}$ n-paraffin.

5. The process of claim 3, wherein said carbon source is a material containing sucrose or fructose as sugar source.

6. The process of claim 3, wherein said carbon source is acetic acid.

7. The process of claim 1, wherein said bacterium is the genus *Corynebacterium*.

8. The process of claim 1, wherein said bacterium is the genus *Nocardia*.

9. The process of claim 1, wherein said bacterium is the species *Corynebacterium hydrocarboclastus*.

10. The process of claim 1, wherein said bacterium is the species *Nocardia paraffinica*.

11. The process of claim 1, wherein said culturing occurs at 20°C to 45°C at a pH of 4 to 10.

12. The process of claim 1, wherein the bacterium is a mutant strain which is capable of growing in the presence of a high concentration of chloramphenicol or its analogs.

13. The process of claim 10, wherein the mutant strain of bacterium has the resistance to at least 40 µg/ml of chloramphenicol or its analogs.

14. The process of claim 1, wherein the bacterium is *Corynebacterium hydrocarboclastus* ATCC 21,784.

15. The process of claim 1, wherein the bacterium is *Corynebacterium hydrocarboclastus* ATCC 21,923.

16. The process of claim 1, wherein the bacterium is *Nocardia paraffinica* ATCC 21,785.

17. The process of claim 1, wherein the bacterium is *Nocardia paraffinica* ATCC 21,924.

* * * * *